United States Patent
Urashima et al.

(10) Patent No.: US 10,539,264 B2
(45) Date of Patent: Jan. 21, 2020

(54) INEXPENSIVE AUTOMOBILE COMPONENT AND OIL FEED PIPE HAVING EXCELLENT SALT CORROSION RESISTANCE

(71) Applicant: NIPPON STEEL & SUMIKIN STAINLESS STEEL CORPORATION, Tokyo (JP)

(72) Inventors: Hiroshi Urashima, Hikari (JP);
Yoshiharu Inoue, Kitakyushu (JP);
Toshio Tanoue, Yokohama (JP)

(73) Assignee: NIPPON STEEL & SUMIKIN STAINLESS STEEL CORPORATION, Tokyo (JP)

( * ) Notice: Subject to any disclaimer, the term of this patent is extended or adjusted under 35 U.S.C. 154(b) by 331 days.

(21) Appl. No.: 15/549,953

(22) PCT Filed: Feb. 9, 2016

(86) PCT No.: PCT/JP2016/053742
§ 371 (c)(1),
(2) Date: Aug. 9, 2017

(87) PCT Pub. No.: WO2016/129576
PCT Pub. Date: Aug. 18, 2016

(65) Prior Publication Data
US 2018/0031169 A1    Feb. 1, 2018

(30) Foreign Application Priority Data

Feb. 10, 2015   (JP) .................................. 2015-023998

(51) Int. Cl.
*F16L 58/04*    (2006.01)
*C22C 38/00*    (2006.01)
(Continued)

(52) U.S. Cl.
CPC ................ *F16L 58/04* (2013.01); *C09D 5/08* (2013.01); *C09D 167/02* (2013.01); *C22C 38/00* (2013.01);
(Continued)

(58) Field of Classification Search
CPC ........ F16L 58/04; F16L 58/185; C22C 38/00; C22C 38/28; C22C 38/60; C22C 38/001;
(Continued)

(56) References Cited

U.S. PATENT DOCUMENTS

2003/0183626 A1   10/2003   Tomimura et al.
2005/0194049 A1    9/2005   Yoshida et al.
(Continued)

FOREIGN PATENT DOCUMENTS

CA         2924212 A1     3/2015
JP      2002-242779 A     8/2002
(Continued)

OTHER PUBLICATIONS

International Search Report for PCT/JP2016/053742 (PCT/ISA/210) dated May 10, 2016.
(Continued)

*Primary Examiner* — Michael C Miggins
(74) *Attorney, Agent, or Firm* — Birch, Stewart, Kolasch & Birch, LLP (57) ABSTRACT

An automotive member or oil filler pipe includes: a member of ferritic stainless steel containing, in mass %, at most 0.015% of C, at most 0.015% of N, 10.5 to 18.0% of Cr, 0.01 to 0.80% of Si, 0.01 to 0.80% of Mn, at most 0.050% of P, at most 0.010% of S, 0.010 to 0.100% of Al, more than 0.3 to 1.5% of Mo, and one or both of 0.03 to 0.30% of Ti and Nb; and a metal fitting of an aluminized stainless steel sheet, which is attached to the member to define therebetween a gap structure to be exposed to a chloride environment, and
(Continued)

has an Al-plating weight per unit area ranging from 20 to 150 g/m² in the gap structure. Surfaces of the metal fitting and member not facing the gap are coated with a cation electrodeposition coating film having a thickness of 5 to 35 μm.

19 Claims, 5 Drawing Sheets

(51) Int. Cl.
| | |
|---|---|
| C22C 38/28 | (2006.01) |
| C22C 38/60 | (2006.01) |
| C09D 5/08 | (2006.01) |
| C09D 167/02 | (2006.01) |
| C22C 38/02 | (2006.01) |
| C22C 38/04 | (2006.01) |
| C22C 38/06 | (2006.01) |
| C22C 38/20 | (2006.01) |
| C22C 38/24 | (2006.01) |
| C22C 38/30 | (2006.01) |
| C22C 38/32 | (2006.01) |
| C22C 38/44 | (2006.01) |
| C22C 38/48 | (2006.01) |
| C22C 38/50 | (2006.01) |
| C25D 13/04 | (2006.01) |
| F16L 58/18 | (2006.01) |
| C22C 21/02 | (2006.01) |
| F01M 11/04 | (2006.01) |

(52) U.S. Cl.
CPC .......... *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/20* (2013.01); *C22C 38/24* (2013.01); *C22C 38/28* (2013.01); *C22C 38/30* (2013.01); *C22C 38/32* (2013.01); *C22C 38/44* (2013.01); *C22C 38/48* (2013.01); *C22C 38/50* (2013.01); *C22C 38/60* (2013.01); *C25D 13/04* (2013.01); *F16L 58/185* (2013.01); *B60Y 2410/13* (2013.01); *C22C 21/02* (2013.01); *F01M 11/04* (2013.01)

(58) Field of Classification Search
CPC ..... C22C 38/002; C22C 38/008; C22C 38/02; C22C 38/04; C22C 38/06; C22C 38/20; C22C 38/24; C22C 38/30; C22C 38/32; C22C 38/44; C22C 38/48; C22C 38/50; C22C 21/02; C09D 5/08; C09D 167/02; C25D 13/04; B60Y 2410/13; F01M 11/04
See application file for complete search history.

(56) References Cited

U.S. PATENT DOCUMENTS

| | | |
|---|---|---|
| 2009/0053551 A1 | 2/2009 | Sakamoto et al. |
| 2012/0103944 A1 | 5/2012 | Nishida et al. |
| 2013/0074971 A1 | 3/2013 | Sakamoto et al. |
| 2016/0230261 A1 | 8/2016 | Urashima et al. |

FOREIGN PATENT DOCUMENTS

| | | |
|---|---|---|
| JP | 2003-277992 A | 10/2003 |
| JP | 2004-210003 A | 7/2004 |
| JP | 2005-206064 A | 8/2005 |
| JP | 2006-144040 A | 6/2006 |
| JP | 2006-231207 A | 9/2006 |
| JP | 2009-68102 A | 4/2009 |
| JP | 2012-12005 A | 1/2012 |
| JP | 2012-96570 A | 5/2012 |
| JP | 2012-197071 A | 10/2012 |
| WO | WO 2015/037707 A1 | 3/2015 |

OTHER PUBLICATIONS

Jun Maki, "Aluminized Steel Sheets", Journal of the Surface Finishing Society of Japan, vol. 62, No. 1, (2011), pp. 20-24.

Toshiharu Kittaka, "Hot-Dip Al Coated Steel Sheet", Journal of the Surface Finishing Society of Japan, vol. 42, No. 2, (1991), pp. 169-177.

Written Opinion of the International Searching Authority for PCT/JP2016/053742 (PCT/ISA/237) dated May 10, 2016.

Yoshito Ohtake, "The Damage of Vulcanized Rubber by New Fuels for Automobile, Including Metal and Plastics", Journal of Society of Rubber Science and Technology, Japan, vol. 81, No. 9, (2008), pp. 376-382.

International Preliminary Report on Patentability and English translation of the Written Opinion of the International Searching Authority (Forms PCT/IB/373 and PCT/ISA/237), dated Aug. 15, 2017, for International Application No. PCT/JP2016/053742.

Canadian Office Action dated Apr. 9, 2019, for corresponding Canadian Patent Application No. 2975977.

Korean Office Action, dated Oct. 17, 2018, for corresponding Korean Application No. 10-2017-7025075, with an English translation.

INEXPENSIVE AUTOMOBILE COMPONENT AND OIL FEED PIPE HAVING EXCELLENT SALT CORROSION RESISTANCE

TECHNICAL FIELD

The present invention relates to an inexpensive automotive member excellent in salt corrosion resistance. In particular, the present invention relates to an oil filler pipe with a reliable excellent corrosion resistance that is intended for use in an area where a salt content such as snow-melting salt is likely to stick to an automobile.

BACKGROUND ART

United States laws and regulations obligate an oil filler pipe for an automobile to assure a life of 15 years or 150,000 miles running. An oil filler pipe made of stainless steel (SUS436L: 17Cr-1.2Mo) has been already put into practical use.

An automobile traveling in North America or Europe is exposed to an environment with snow-melting salt, so that a material used for an oil filler pipe needs to have an excellent salt corrosion resistance. Accordingly, SUS436L has been used as a material for an oil filler pipe. However, cost reductions have come to be demanded due to the recent increase in resource prices. To achieve cost reductions, integrally molded components may be used to reduce the number of components instead of using an inexpensive material. In this case, a metal fitting should be directly attached to an inlet pipe as a main component. This entails formation of a gap structure between the inlet pipe and the attached component. Corrosion is likely to occur in a gap as compared with a 'general part' other than the gap. In particular, crevice corrosion occurs in a gap on an outer surface of an oil filler pipe exposed to a chloride environment. If the inlet pipe, through which fuel passes, is holed due to crevice corrosion, fuel leakage may occur, causing a serious accident.

Conventionally, coating such as cation electrodeposition coating has been applied as a means for improving salt corrosion resistance in the gap.

For example, Patent Literature 1 discloses a production method of subjecting an oil filler pipe assembled by projection welding using a SUS436 pipe as a material to cation electrodeposition coating. However, this technology, which uses SUS436 as a material, cannot completely prevent corrosion because it is difficult to apply cation electrodeposition coating to a gap present on a surface of the oil filler pipe even when SUS436 is used, according to the knowledge of the inventors. Accordingly, this technology is supposed to be unable to offer a sufficient rust prevention effect in an environment with snow-melting salt.

Patent Literature 2 discloses a technology of preventing crevice corrosion by subjecting an oil filler pipe assembled using SUS436 as a material to electrostatic coating. Alternatively, Patent Literature 3 discloses a technology of subjecting a stainless steel oil filler pipe to coating for chipping resistance and assuring a sufficient rust prevention property even when the oil filler pipe is subjected to chipping. However, these technologies require higher cost for coating than electrodeposition coating. Meanwhile, an inside of a gap cannot be coated, and therefore there is no guarantee that a sufficient rust prevention effect is obtained in the gap.

Patent Literature 4 discloses a technology of providing a projection on a gap-forming member and controlling an opening amount of the gap to 0.2 mm or more for covering an inside of the gap by electrodeposition coating.

Additionally, a rust prevention method other than coating is also proposed. For example, Patent Literature 5 discloses a technology of allowing for sacrificial protection by disposing a zinc sacrificial anode in a gap or a portion in which a passive state film is impaired by welding, brazing, plastic working, or the like in assembling a stainless steel oil filler pipe. However, it is troublesome and takes time to dispose zinc at all the portions that are at risk of corrosion. As described in Non-patent Literature 1, zinc is consumed easily in a chloride environment, and thus a large amount of zinc is disadvantageously required. In Patent Literature 6, a galvanized steel plate is used for an inlet pipe to eliminate a gap by filling the gap with melted zinc. However, as described above, zinc is consumed very easily in a salt damage-resistant environment. Further, since an oil inlet enters an inlet pipe, melted zinc is likely to invade the inlet pipe to be reacted with water, so that a corrosion product such as zinc hydroxide may be formed to cause clogging of fuel injection equipment.

CITATION LIST

Patent Literature(s)

Patent Literature 1: JP 2002-242779 A
Patent Literature 2: JP 2004-210003 A
Patent Literature 3: JP 2006-231207 A
Patent Literature 4: JP 2012-12005 A
Patent Literature 5: JP 2005-206064 A
Patent Literature 6: JP 2012-96570 A

Non-Patent Literature(s)

Non-patent Literature 1: Toshiharu Kittaka: Journal of The Surface Finishing Society of Japan, Vol. 42 (1991), No. 2, 169-177
Non-patent Literature 2: Yoshito Ohtake: Journal of Society of Rubber Science and Technology, Japan, Vol. 81 (2008), No. 9, 376-382
Non-patent Literature 3: Jun Maki: Journal of The Surface Finishing Society of Japan, Vol. 62 (2011), No. 1, 20-24

SUMMARY OF THE INVENTION

Problem(s) to be Solved by the Invention

An object of the invention is to assure salt corrosion resistance (a weakness of stainless steel), particularly corrosion resistance in a gap, when a material at most comparable in grade to SUS436L is used and a gap structure is present between an inlet pipe and a component.

In the technology of Patent Literature 4, in an oil filler pipe including a steel pipe member made of a material at most comparable in grade to SUS436L and a metal fitting attached thereto, it is necessary to control an opening amount of a gap in a gap structure to 0.2 mm or more so that an inside of the gap in the gap structure on a surface exposed to a chloride environment is covered by electrodeposition coating. Technical development for controlling the opening amount of the gap uniformly by forming a projection on a gap-forming member has been required. An object of the invention is to provide an inexpensive automotive member excellent in salt corrosion resistance, assuring corrosion resistance of a gap structure regardless of an opening amount of a gap.

Means for Solving the Problem(s)

The inventors have noted the usefulness of a sacrificial protection performance of Al which is less consumed than Zn in a chloride environment as a means for assuring corrosion resistance in a gap. However, as described in Non-patent Literature 2, Al has little resistance to bioethanol. When a plating seed of a member in contact with a fuel, such as an inlet pipe in Patent Literature 6, is changed from Zn to Al, a sacrificial protection effect is exhibited for a short time due to a rapid corrosion of Al. Accordingly, the inventors have devised a structure in which an aluminized stainless steel sheet is used for a metal fitting having a low possibility of adhesion of a fuel and a stainless steel sheet is used for a steel pipe member in contact with a fuel, such as an inlet pipe, in order to reduce corrosion of the steel pipe member. Based on the structure, the inventors have examined the usefulness of sacrificial protection by Al. First, a gap test piece with an aluminized stainless steel sheet in contact with a stainless steel sheet and a gap test piece with stainless steel sheets in contact with each other were manufactured to examine salt corrosion resistance. As a result, the inventors have found that crevice corrosion is reduced by a sacrificial protection performance of an aluminized layer. In addition, the inventors have found that consumption of Al-plating is reduced by covering a surface of a test piece in other parts than a gap by subjecting the parts to cation electrodeposition coating and that a life of corrosion resistance is extended. The inventors have clarified necessary conditions of an Al-plating weight per unit area for obtaining a predetermined life of corrosion resistance.

However, since the above method utilizes a sacrificial protection effect of Al-plating, the plated part is melted more rapidly than stainless and the eluted Al may cause a problem. For example, in a case of a gap being formed from an end of an inlet pipe and a metal fitting, such as an oil inlet, a structure in which the metal fitting enters the inlet pipe as in Patent Literature 6 suffers invasion of eluted Al into the inlet pipe irrespective of whether or not a stainless steel sheet is holed. The Al then reacts with moisture to generate an Al-based corrosion product (e.g. aluminum hydroxide) having a low solubility, which is precipitated at a bottom of a fuel tank The Al-based corrosion product is accumulated in the fuel tank, and, in the end, may cause clogging in a fuel injection inlet, resulting in a failure. In view of the above, the inventors examined a method for attaching a metal fitting made of an aluminized stainless steel sheet. As a result, the inventors have found a structure in which Al does not enter a steel pipe member regardless of consumption of Al-plating by attaching an outer part of the steel pipe member and a metal fitting to predetermined positions.

The invention has a structure based on the above findings, and a gist thereof is as follows.

(1) An automotive member including: a non-aluminized member made of a material that is a ferritic stainless steel containing, in mass %, at most 0.015% of C, at most 0.015% of N, 10.5% to 18.0% of Cr, 0.01% to 0.80% of Si, 0.01% to 0.80% of Mn, at most 0.050% of P, at most 0.010% of S, 0.010% to 0.100% of Al, more than 0.3% to 1.5% of Mo, one or both of at most 0.30% of Ti and at most 0.30% of Nb with a proviso that both of Ti and Nb are not less than 0.03%, and a balance in a form of Fe and inevitable impurities; and a metal fitting made of an aluminized stainless steel sheet having an Al-plating weight per unit area ranging from 20 g/m² to 150 g/m², in which the metal fitting is attached to the non-aluminized member by welding or brazing to define a gap structure, which is to be exposed to a chloride environment, between the member and the metal fitting, and the metal fitting and the non-aluminized member are coated with a cation electrodeposition coating film having a thickness of 5 μm to 35 μm.

(2) The automotive member in which the material for the member further contains at least one of a first group and a second group, the first group consisting of, in mass, at least one of 0.0002% to 0.0050% of B and 0.01% to 0.50% of Sn, the second group consisting of, in mass %, one or more of 0.01% to 0.5% of Cu, 0.01% to 0.5% of Ni, 0.005% to 0.5% of Sb, 0.005% to 0.5% of Zr, 0.005% to 0.5% of Co, 0.005% to 0.5% of W, 0.03% to 0.5% of V, 0.001% to 0.05% of Ga and 0.001% to 0.05% of Ta.

(3) The automotive member in which a material for the metal fitting is a ferritic stainless steel of the same composition range as the material for the non-aluminized member except that the Mo content ranges from 0.005 mass % to 1.5 mass %.

(4) An oil filler pipe including: a non-aluminized steel pipe member made of a steel pipe of a material that is a ferritic stainless steel containing, in mass %, at most 0.015% of C, at most 0.015% of N, 10.5% to 18.0% of Cr, 0.01% to 0.80% of Si, 0.01% to 0.80% of Mn, at most 0.050% of P, at most 0.010% of S, 0.010% to 0.100% of Al, more than 0.3% to 1.5% of Mo, one or both of at most 0.30% of Ti and at most 0.30% of Nb with a proviso that both of Ti and Nb are not less than 0.03%, and a balance in a form of Fe and inevitable impurities; and a metal fitting made of an aluminized stainless steel sheet having an Al-plating weight per unit area ranging from 20 g/m² to 150 g/m², in which the metal fitting is attached to an outer circumferential surface of the non-aluminized steel pipe member by welding or brazing at a position not in contact with a fuel to define a gap structure, which is to be exposed to a chloride environment, between the non-aluminized member and the metal fitting, and the metal fitting and the non-aluminized steel pipe member are coated with a cation electrodeposition coating film having a thickness of 5 μm to 35 μm.

(5) The oil filler pipe in which the material for the steel pipe member further contains at least one of a first group and a second group, the first group consisting of, in mass, at least one of 0.0002% to 0.0050% of B and 0.01% to 0.50% of Sn, the second group consisting of, in mass %, one or more of 0.01% to 0.5% of Cu, 0.01% to 0.5% of Ni, 0.005% to 0.5% of Sb, 0.005% to 0.5% of Zr, 0.005% to 0.5% of Co, 0.005% to 0.5% of W, 0.03% to 0.5% of V, 0.001% to 0.05% of Ga and 0.001% to 0.05% of Ta.

(6) The oil filler pipe in which a material for the metal fitting is a ferritic stainless steel of the same composition range as the material for the steel pipe member except that the Mo content ranges from 0.005 mass % to 1.5 mass %.

(7) The oil filler pipe in which an oil inlet structure is defined, in which the steel pipe member is an inlet pipe, the metal fitting is a truncated cone member that is attached to an outer periphery of the steel pipe member with a small-diameter base of the truncated cone at a position 5 mm or more apart from an end of the inlet pipe.

(8) An automotive member including: a non-aluminized member made of a material that is a ferritic stainless steel containing, in mass %, at most 0.015% of C, at most 0.015% of N, 10.5% to 18.0% of Cr, 0.01% to 0.80% of Si, 0.01% to 0.80% of Mn, at most 0.050% of P, at most 0.010% of S, 0.010% to 0.100% of Al, more than 0.3% to 1.5% of Mo, one or both of at most 0.30% of Ti and at most 0.30% of Nb with a proviso that both of Ti and Nb are not less than 0.03%, and a balance in a form of Fe and inevitable impurities; and a metal fitting made of an aluminized stainless steel sheet, in which the metal fitting is attached to the non-aluminized member to define a gap structure, which is to be exposed to a chloride environment, between the member and the metal fitting, the metal fitting has an Al-plating weight per unit area ranging from 20 g/m² to 150 g/m² on a surface thereof facing a gap in the gap structure, and a surface of the metal fitting and a surface of the non-aluminized member that do not face the gap are coated with a cation electrodeposition coating film having a thickness of 5 μm to 35 μm.

(9) The automotive member in which the material for the member further contains at least one of a first group and a second group, the first group consisting of, in mass, at least one of 0.0002% to 0.0050% of B and 0.01% to 0.50% of Sn, the second group consisting of, in mass %, one or more of 0.01% to 0.5% of Cu, 0.01% to 0.5% of Ni, 0.005% to 0.5% of Sb, 0.005% to 0.5% of Zr, 0.005% to 0.5% of Co, 0.005% to 0.5% of W, 0.03% to 0.5% of V, 0.001% to 0.05% of Ga and 0.001% to 0.05% of Ta.

(10) The automotive member in which a material for the metal fitting is a ferritic stainless steel of the same composition range as the material for the non-aluminized member except that the Mo content ranges from 0.005 mass % to 1.5 mass %.

(11) An oil filler pipe including: a non-aluminized steel pipe member made of a steel pipe of a material that is a ferritic stainless steel containing, in mass %, at most 0.015% of C, at most 0.015% of N, 10.5% to 18.0% of Cr, 0.01% to 0.80% of Si, 0.01% to 0.80% of Mn, at most 0.050% of P, at most 0.010% of S, 0.010% to 0.100% of Al, more than 0.3% to 1.5% of Mo, one or both of at most 0.30% of Ti and at most 0.30% of Nb with a proviso that both of Ti and Nb are not less than 0.03%, and a balance in a form of Fe and inevitable impurities; and a metal fitting made of an aluminized stainless steel sheet, in which the metal fitting is attached to the steel pipe member to define a gap structure, which is to be exposed to a chloride environment, between a position on an outer circumferential surface of the non-aluminized steel pipe member not in contact with a fuel and the metal fitting, the metal fitting has an Al-plating weight per unit area ranging from 20 g/m² to 150 g/m² on a surface thereof facing a gap in the gap structure, and a surface of the metal fitting and a surface of the non-aluminized steel pipe member that do not face the gap are coated with a cation electrodeposition coating film having a thickness of 5 μm to 35 μm.

(12) The oil filler pipe in which the material for the steel pipe member further contains at least one of a first group and a second group, the first group consisting of, in mass, at least one of 0.0002% to 0.0050% of B and 0.01% to 0.50% of Sn, the second group consisting of, in mass %, one or more of 0.01% to 0.5% of Cu, 0.01% to 0.5% of Ni, 0.005% to 0.5% of Sb, 0.005% to 0.5% of Zr, 0.005% to 0.5% of Co, 0.005% to 0.5% of W, 0.03% to 0.5% of V, 0.001% to 0.05% of Ga and 0.001% to 0.05% of Ta.

(13) The oil filler pipe in which a material for the metal fitting is a ferritic stainless steel of the same composition range as the material for the steel pipe member except that the Mo content ranges from 0.005 mass % to 1.5 mass %.

(14) The oil filler pipe in which an oil inlet structure is defined, in which the steel pipe member is an inlet pipe, the metal fitting is a truncated cone member that is attached to an outer periphery of the steel pipe member with a small-diameter base of the truncated cone at a position 5 mm or more apart from an end of the inlet pipe.

The invention can provide an inexpensive oil filler pipe stably assuring salt corrosion resistance, and therefore provides a large industrial effect.

That is, the technology of the invention allows an oil filler pipe, which includes a steel pipe member made of a material at most comparable in grade to SUS436L and a metal fitting attached to the steel pipe member, to have a reliable corrosion resistance in the case of the gap in a gap structure having a small opening amount, because a surface of the metal fitting facing a gap exposed to a chloride environment is aluminized and surfaces of the steel pipe member and the metal fitting not facing the gap are covered with a cation electrodeposition coating film. In contrast, in the case of the opening amount being large, corrosion resistance can be assured by covering an inside of the gap in the gap structure on a surface exposed to a chloride environment with the electrodeposition coating.

In addition, when the oil filler pipe is used to an oil inlet, an aluminized stainless steel metal component is attached to an outer side of an inlet pipe to prevent invasion of consumed Al into the inlet pipe, thereby reducing clogging in a fuel injection inlet of an engine caused by an Al corrosion product and thus preventing a failure. In this way, corrosion resistance can be stably assured without particularly controlling a structure of the opening amount of the gap in the gap structure.

DESCRIPTION OF EMBODIMENT(S)

The invention will be described in detail below.

A member in the invention is a general term for a member whose inner surface is exposed to a fuel environment and whose outer surface is exposed to a chloride environment. A pipe-shaped member obtained by molding a steel pipe is referred to as a steel pipe member, which includes a main pipe, a breather, a fuel pipe, and the like. The main pipe, which is also referred to as an inlet pipe, is a pipe configured to introduce a fuel from an oil inlet into a fuel tank. A metal fitting is a general term for a component exposed only to a chloride environment and forming a gap between the metal fitting and a member or a steel pipe member, and includes a pipe support member, a metal component referred to as, for example, a stay or a bracket, and a member referred to as a cap protector or a retainer. An automotive member includes the member and the metal fitting attached to the member. An oil filler pipe includes the steel pipe member and the metal fitting attached to the steel pipe member.

Figure 1A:
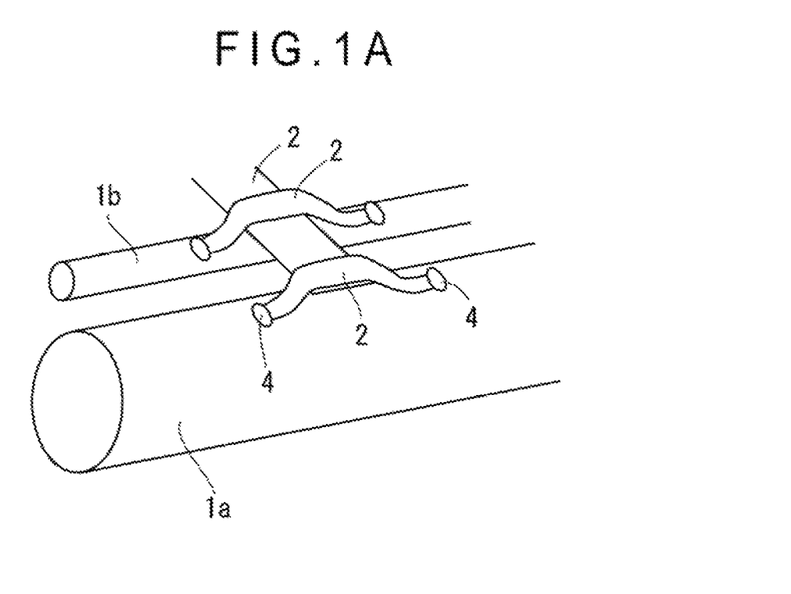
FIG. 1A is a perspective view illustrating an exemplary gap structure of a gap existing in a central part of an oil filler pipe.
Figure 1B:
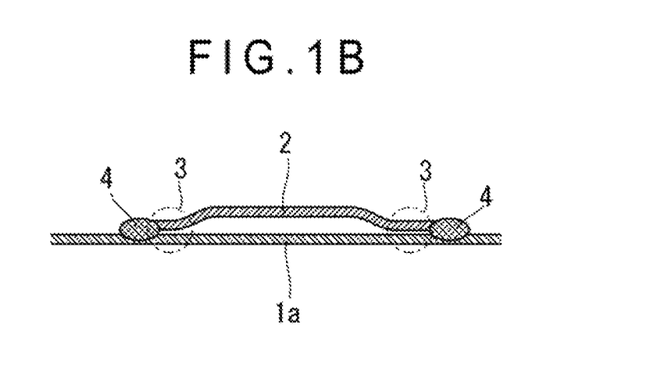
FIG. 1B is a cross sectional view illustrating the exemplary gap structure of the gap existing in the central part of the oil filler pipe.
Figure 2A:
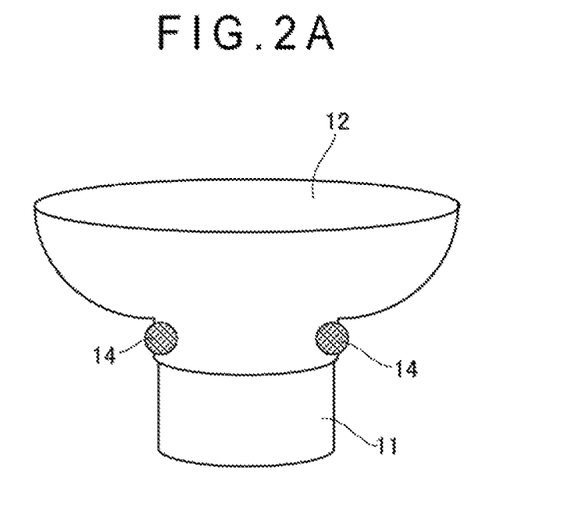
FIG. 2A is a perspective view illustrating an exemplary gap structure of a gap existing in an oil inlet of the oil filler pipe.
Figure 2B:
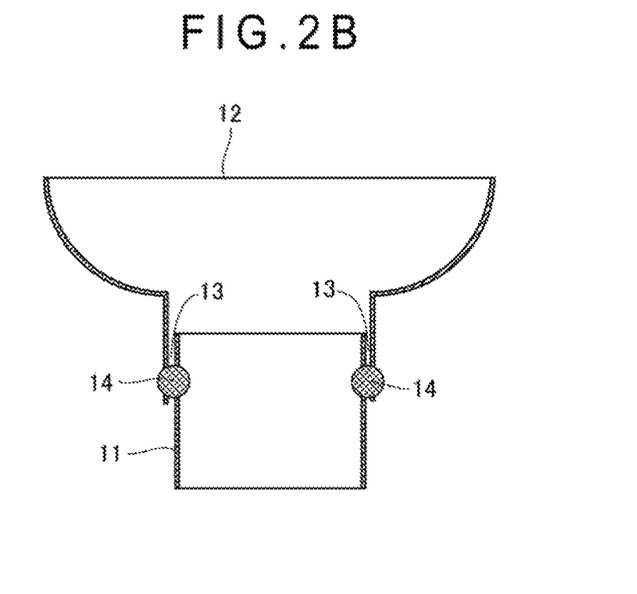
FIG. 2B is a cross sectional view illustrating the exemplary gap structure of the gap existing in the oil inlet of the oil filler pipe.

An automotive member of the invention and an oil filler pipe as a typical example thereof include gaps as illustrated, for instance, in FIGS. 1A, 1B, 2A and 2B. FIGS. 1A and 1B illustrate the central part of the oil filler pipe. FIG. 1A is a schematic perspective view illustrating a metal fitting 2 for binding and fixing a main pipe 1a (steel pipe member 1) and a breather tube 1b (steel pipe member 1) to a car body, the metal fitting 2 being attached to the main pipe 1a and the breather tube 1b at a welded part 4 by welding. FIG. 1B is a schematic cross sectional view of an attachment part of the metal fitting 2 to the main pipe 1a. Both FIGS. 1A and 1B illustrate a gap 3 formed near the welded part 4 between the metal fitting 2 and the main pipe 1a or the breather tube 1b (i.e., the steel pipe member 1). FIGS. 2A and 2B illustrate an oil inlet of an oil filler pipe. Here, the main pipe is referred to as an inlet pipe. FIG. 2A is a schematic perspective view illustrating a cap protector (metal fitting 12) attached to an inlet pipe (steel pipe member 11) at a welded part 14. FIG. 2B is a schematic cross sectional view of an attachment part of the metal fitting 12 to the inlet pipe. Both FIGS. 2A and 2B illustrate a gap 13 formed near the welded part 14 between the metal fitting 12 and the inlet pipe (i.e., the steel pipe member 11). In the invention, a part including the gap 3 or the gap 13 is referred to as a gap structure.

The target of the invention is a gap structure exposed to a chloride environment.

When an inside of such a gap is filled with salt water to be subjected to a wet and dry cycle, crevice corrosion occurs and grows to make a hole in the steel pipe member. In order to prevent the hole formation, it is important to prevent occurrence of crevice corrosion itself in addition to growth of crevice corrosion, for which sacrificial protection is usually performed.

Zn is generally used as a sacrificial anode for sacrificial protection, but is disadvantageously rapidly consumed in a chloride environment. In contrast, when Al is used as a sacrificial anode, advantages including: relatively small consumption amount of Al in a chloride environment; a large amount of generated electricity; and being capable of serving as a reinforcing member by attaching Al to a steel sheet by hot-dip plating are believed to be obtainable.

Accordingly, gap test pieces made of a stainless steel sheet corresponding to a steel pipe member and an aluminized stainless steel sheet corresponding to a metal fitting were initially manufactured to examine salt corrosion resistance.

Each of the gap test pieces was manufactured by overlapping a large plate having a size of t0.8×70×150 mm and a small plate having a size of t0.8×40×40 mm and spot-welding the central part of the large and small plates. The large plate corresponds to the steel pipe member, and a ferritic stainless steel sheet was used therefor. The small plate corresponds to the metal fitting, and aluminized stainless steel sheets having various Al-plating weight per unit areas were used therefor. Large plates including components in Examples of the invention shown in Tables 1-1 and 1-2 were used. Small plates obtained by subjecting stainless steel sheets including components shown in Table 2 to Al-plating in various adhesion amounts were used. A part in which the large plate faces the small plate defines a gap.

Each of the gap test pieces was subjected to cation electrodeposition coating and then to a salt corrosion test. In cation electrodeposition coating, PN-110 manufactured by NIPPONPAINT Co., Ltd. was used as a coating material, electrification was performed at a bath temperature of 28 degrees C. and a coating voltage of 170 V, and conditions were selected such that the thickness of a coating film was from 2 μm to 40 μm in a general part (other parts than a gap on the surfaces of the large plate and the small plate). A baking condition was 170 degrees C.×20 minutes. The thicknesses of a coating film at five points were measured per a sample using an electromagnetic film thickness meter, and an average value thereof was used as a film thickness. In some test pieces, a weld nugget was punched after electrodeposition coating, and an inside of a gap was observed to find that no coating film was formed inside the gap.

As a test for evaluating salt corrosion resistance of these gap test pieces, a compound cyclic corrosion test in a JASO mode (cyclic corrosion test regulated by JASO-M609-91 (repetition of spraying salt water: spraying 5% NaCl, 35 degrees C.×2 Hr, drying: relative humidity 20%, 60 degrees C.×4 Hr, and wetting: relative humidity 90%, 50 degrees C.×2 Hr)) was used. As a test period, 500 cycles were performed. After the test was finished, the corrosion depth in a gap was measured by a focal depth method with a microscope.

Figure 3:
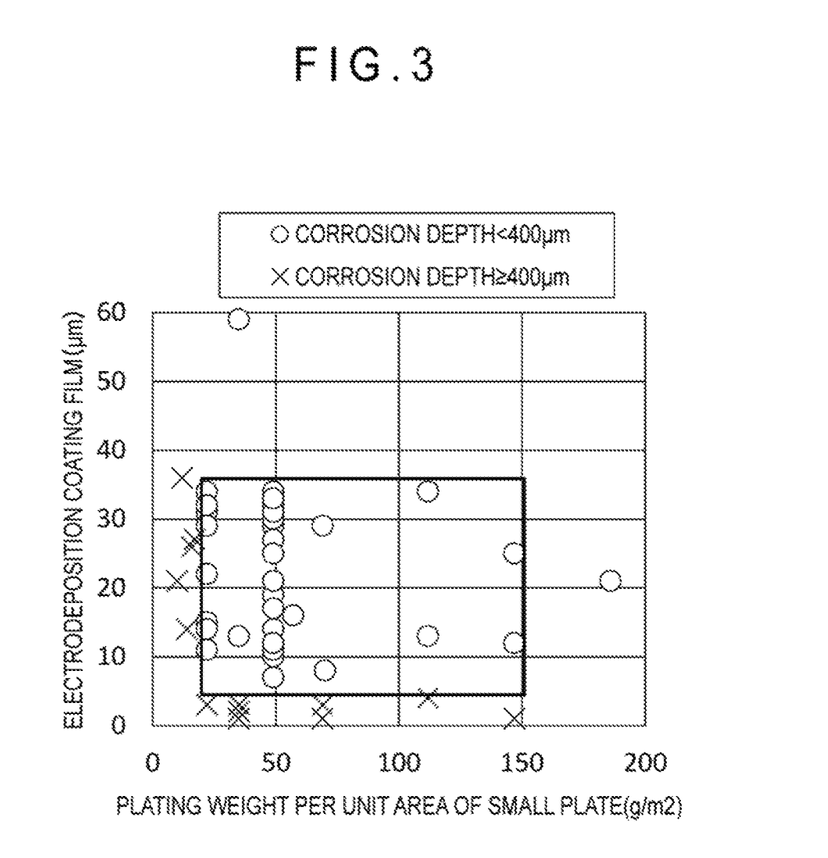
FIG. 3 is a diagram illustrating an influence of an Al-plating weight per unit area of a small plate of a gap test piece and a thickness of an electrodeposition coating film of the gap test piece on a depth of crevice corrosion.

Test results are shown in FIG. 3. In FIG. 3, the abscissa represents a plating weight per unit area of the small plate, the ordinate represents an electrodeposition coating thickness, a circle mark represents an in-gap corrosion depth of less than 400 μm, and a cross mark represents an in-gap corrosion depth of 400 μm or more. FIG. 3 shows that crevice corrosion can be significantly reduced by the sacrificial protection effect of Al of the aluminized stainless steel sheet of the small plate but an Al-plating weight per unit area and the thickness of a cation electrodeposition coating film have to be proper in order to obtain a satisfactory effect. Specifically, in order to maintain the sacrificial protection effect for a long time, a larger absolute amount of Al is more advantageous. In order to maintain the large amount of Al, it is necessary to increase the initial absolute amount and to reduce consumption. FIG. 3 suggests that the initial absolute amount of crevice corrosion can be controlled by the Al-plating weight per unit area and reduction in Al consumption can be controlled by the thickness of a cation electrodeposition coating film on a general surface. FIG. 3 indicates that the Al-plating weight per unit area is required to be 20 g/m$^2$ or more and the thickness of the cation electrodeposition coating film is required to be 5 μm or more. Obviously, a larger Al-plating weight per unit area and a larger thickness of the cation electrodeposition coating film are more preferable. However, an upper limit of the Al-plating weight per unit area is 150 g/m$^2$, and an upper limit of the thickness of the cation electrodeposition coating film is 35 μm considering inexpensiveness. Here, on a surface of the small plate facing the large plate (gap), a cation electrodeposition coating film is not formed because of a gap and an aluminized surface is exposed. The surface Al in this exposed part contributes to sacrificial protection.

As described above, the metal fitting in the invention is made of an aluminized stainless steel sheet, and requires 20 g/m$^2$ or more of Al-plating weight per unit area on a surface facing the gap. This is because satisfactory corrosion resistance cannot be obtained with a plating weight per unit area lower than the above value. In contrast, a larger plating weight per unit area makes a life of corrosion resistance longer. However, the life can be extended to some degree by covering surfaces in other parts than a gap with a cation electrodeposition coating film, and the upper limit of the plating weight per unit area is 150 g/m² also considering cost. The "surface facing the gap" herein means a surface constituting the gap generated by the metal fitting coming close to or facing the member or the steel pipe member.

An aluminized stainless steel sheet manufactured by a hot-dip plating method can be used. A Type I aluminized stainless steel sheet manufactured using an Al-5% to 15% Si bath is more preferably usable than a Type II aluminized stainless steel sheet manufactured using a pure Al bath. This is because Type I has a smaller thickness of an alloy layer existing in an interface between a plated layer and a stainless basic material and causes less peeling of the plated layer during molding than Type II. Such a Type I aluminized layer usually contains about 10 mass % of Si and about 1 mass % of Al—Fe—Si intermetallic compound as described in Non-patent Literature 3.

A cation electrodeposition coating film is formed at least on a surface (referred to as "general surface") in other parts than an inside of the gap among the surfaces of the member, the steel pipe member, and the metal fitting. An electrodeposition coating film on the general surface limits a region which an Al corrosion prevention current reaches to the gap. This slows a consumption rate of Al and can extend a corrosion prevention life. The cation electrodeposition coating film requires a film thickness of 5 µm or more. However, a too large film thickness saturates the effect, and therefore the upper limit of the cation electrodeposition coating film is preferably 35 µm. Whether a cation electrodeposition coating film is formed on a surface of a gap of the member, the steel pipe member, or the metal fitting depends on an opening amount of the gap. When the opening amount of the gap is large enough for forming an electrodeposition coating film (0.2 mm or more), an electrodeposition coating film is formed in the gap of the member or the steel pipe member, so that generation of crevice corrosion can be prevented. In contrast, when the opening amount of the gap is small and an electrodeposition coating film is not formed on a surface facing the gap, crevice corrosion occurs in this part of the member or the steel pipe member in the related art. However, in the invention, since the inside of the gap of the metal fitting is aluminized and an electrodeposition coating film is not formed in this part of the metal fitting, Al is exposed, so that sacrificial protection effect by Al can be exhibited.

Figure 4A:
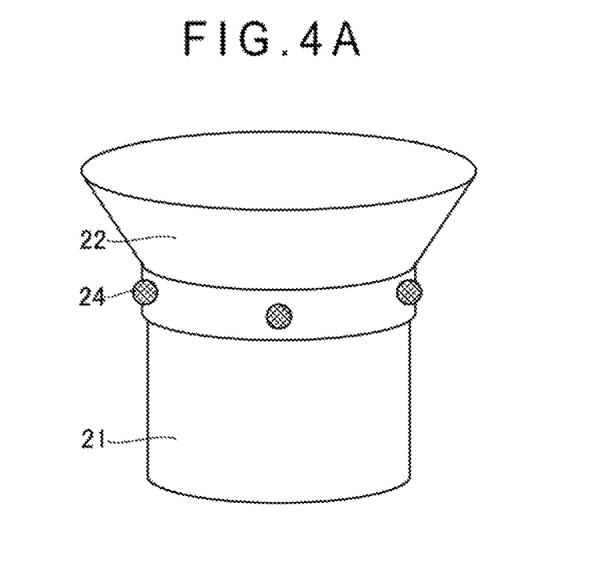
FIG. 4A is a perspective view illustrating a shape of a test piece of structure I used for structure examination.
Figure 4B:
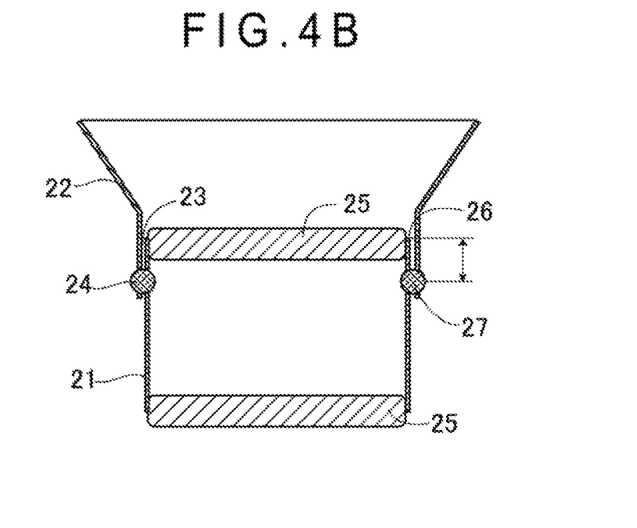
FIG. 4B is a cross sectional view illustrating the shape of the test piece of structure I used for structure examination.
Figure 5A:
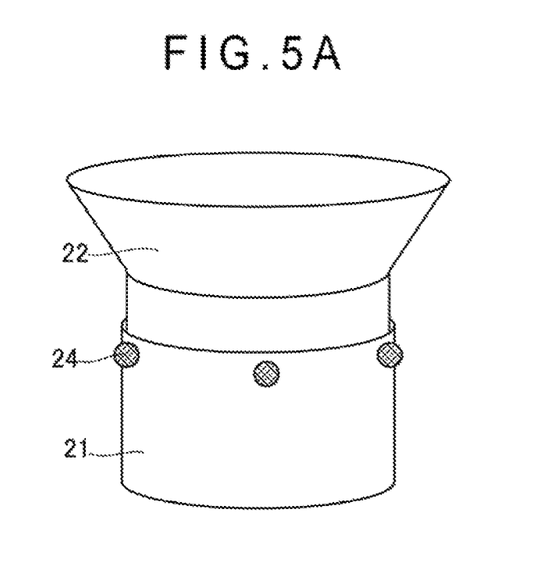
FIG. 5A is a perspective view illustrating a shape of a test piece of structure II used for structure examination.

Furthermore, in order to prevent invasion of an Al component into the inlet pipe, which is a matter to be concerned when the metal fitting according to the invention is used for an oil inlet member, an attachment structure of a metal fitting made of an aluminized stainless steel sheet was examined. Test pieces obtained in the following manner were used as illustrated in FIGS. 4A and 5A. Specifically, aluminized stainless steel pipes 22 simulating the oil inlet member (the metal fitting) were each welded to an outer surface and an inner surface of ferritic stainless steel pipes 21 simulating the inlet pipe at four spot welded parts 24 to form a gap 23. The ferritic stainless steel pipes 21 included components of No. E01 in Table 1-1, and had a shape of φ50×50L×0.8t mm. The aluminized stainless steel pipe 22 included components of No. A3 in Table 2, and had an Al-plating weight per unit area of 49 g/cm². When the aluminized stainless steel pipe 22 was welded to the outer surface of the ferritic stainless steel pipe 21 as in structure I in FIGS. 4A and 4B, the aluminized stainless steel pipe 22 had a shape of φ52×50L×0.8t mm. When the aluminized stainless steel pipe 22 was welded to the inner surface of the ferritic stainless steel pipe 21 as in structure II in FIGS. 5A and 5B, the aluminized stainless steel pipe 22 had a shape of φ48×50L×0.8t mm. The position (attachment position 27) of the welded part 24 for attaching the aluminized stainless steel pipe 22 was changed within a range of 0 to 20 mm from an end of the ferritic stainless steel pipe 21.

The test piece was subjected to cation electrodeposition coating. In cation electrodeposition coating, PN-110 manufactured by NIPPONPAINT Co., Ltd. was used as a coating material, electrification was performed at a bath temperature of 28 degrees C. and a coating voltage of 170 V, and conditions were selected so that the thickness of a coating film was 30 µm in a general part (other parts than the gap 23 on the surfaces of the ferritic stainless steel pipe 21 and the aluminized stainless steel pipe 22). A baking condition was 170 degrees C.×20 minutes. The thicknesses of a coating film at five points were measured per a sample using an electromagnetic film thickness meter, and an average value thereof was used as a film thickness. In some test pieces, a weld nugget was punched after electrodeposition coating, and an inside of a gap was observed to find that no coating film was formed inside the gap.

Figure 5B:
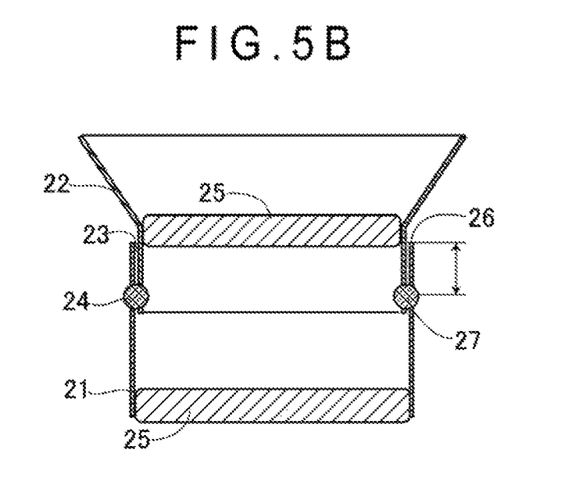
FIG. 5B is a cross sectional view illustrating the shape of the test piece of structure II used for structure examination.

As a test for evaluating salt corrosion resistance of these gap test pieces, a compound cyclic corrosion test in a JASO mode (cyclic corrosion test regulated by JASO-M609-91 (repetition of spraying salt water: spraying 5% NaCl, 35 degrees C.×2 Hr, drying: relative humidity 20%, 60 degrees C.×4 Hr, and wetting: relative humidity 90%, 50 degrees C.×2 Hr)) was used as in the above. As a test period, 500 cycles were performed. During the test, as illustrated in FIGS. 4B and 5B, two parts of an upper part and a lower part in the steel pipe were sealed with silicone caps 25 such that eluted Al liquid did not flow into the ferritic stainless steel pipe 21 naturally.

After the test was finished, whether or not an Al corrosion product invaded the ferritic stainless steel pipe 21 was evaluated.

Test results are shown in Table 4. Any test piece did not have a hole generated by corrosion. However, in the structure II, an Al corrosion product invaded the ferritic stainless steel pipe from the consumed aluminized part. Further, in the structure I with the attachment position 27 located from the end of the ferritic stainless steel pipe 21 by less than 5 mm, corrosion of an end surface of the steel pipe occurred and an Al corrosion product invaded the ferritic stainless steel pipe through a gap between the end and the silicone cap. Accordingly, it is found that when a test piece has the structure I with the attachment position 27 located from the end of the ferritic stainless steel pipe 21 by 5 mm or more, an Al corrosion product does not invade the ferritic stainless steel pipe.

In sum of the above, the automotive member having the gap structure exposed to a chloride environment between the member made of ferritic stainless steel and the metal fitting molded from the aluminized stainless steel sheet and attached to the member, the Al-plating weight per unit area of the metal fitting being 20 g/m² or more and 150 g/m² or less on the surface facing the gap in the gap structure, and at least surfaces of the member and the metal fitting other than the gap being covered with the cation electrodeposition coating film having a thickness of 5 µm to 35 µm, can prevent crevice corrosion effectively regardless of the opening amount of the gap. The metal fitting is only required to be attached to the member to such a degree that both of the metal fitting and the member are electrically conductive with each other. Furthermore, when the invention is applied to an oil inlet, the metal fitting is preferably welded to an outer surface of the inlet pipe (steel pipe member) and at a position 5 mm or more apart from an end surface of the inlet pipe.

With the above arrangement, an effect of preventing invasion of an Al corrosion product into the inlet pipe can be exhibited.

Next, a method for manufacturing the above automotive member of the invention will be described. First, a metal fitting molded made of an aluminized stainless steel sheet having an Al-plating weight per unit area ranging from 20 g/m² to 150 g/m² is attached to a member made of ferritic stainless steel. The metal fitting is preferably attached to the member by welding or brazing. A gap is formed near the attachment part between the member and the metal fitting. This gap is located at a position exposed to a chloride environment. A part including the gap is referred to as a gap structure. In this way, the gap structure exposed to a chloride environment is formed between the member and the metal fitting made of an aluminized stainless steel sheet and attached to the member. Next, surfaces of the metal fitting and the member are covered with a cation electrodeposition coating film having a thickness of 5 μm to 35 μm by cation electrodeposition coating. The metal fitting having Al-plating attached thereto is attached to the member. Therefore, the Al-plating weight per unit area of the metal fitting is 20 g/m² or more and 150 g/m² or less on a surface facing the gap formed near the attachment part. The automotive member of the invention is an automotive member manufactured in such a manner as described above.

By using a steel pipe member made of a steel pipe as the above member, the automotive member of the invention can be used suitably as an oil filler pipe.

Next, materials of the member and the steel pipe member will be described. The steel pipe member herein means a pipe-shaped member such as a main pipe (inlet pipe) or a breather tube which is filled with fuel gas. A material described below is preferably used for the metal fitting.

A feature of the invention is to use a material comparable to SUS436L or smaller to a certain extent in the content of an alloy element than SUS436L. Specifically, a ferritic stainless steel having the following composition is used as the material. Hereinafter, the percentage (%) of the content means mass %.

C, N: Each of C and N is an element to cause intergranular corrosion at part being influenced by welding heat and deteriorates corrosion resistance. These elements also deteriorate cold workability. Accordingly, the content of C or N should be limited to as low level as possible. The upper limit of the content of C or N is preferably 0.015%, and more preferably 0.010%. The lower limit is not particularly specified, but is preferably 0.0010% for C and 0.0050% for N considering refining cost.

Cr: Cr is a basic element to assure corrosion resistance after heating, a proper content of Cr is essential, and the lower limit of the content of Cr is necessary to be 10.5%. The lower limit of the content of Cr is preferably 13.0%, more preferably 16.0%. Further, the upper limit of the content is preferably set to 18.0% in view of deterioration in workability due to the presence of Cr and for the purpose of reducing alloy cost. The upper limit of the content of Cr is preferably 17.5%. In the invention, the content of Cr is preferably less than 13.0%, and more preferably 12.0% or less from a viewpoint of pursuing a lower-grade material.

Ti, Nb: Ti and Nb fix C and N as a carbonitride to reduce intergranular corrosion. Accordingly, one or both of Ti and Nb are/is contained. However, an excessive content of Ti and Nb saturates the effect, and therefore the upper limit of each content of Ti and Nb is set at 0.30%. It should be noted that, when the content of at least one of Ti and Nb is 0.03% or more, the effect can be exhibited. As a proper content of Ti or Nb, the total content of both of the elements is five times or more and 30 times or less of the total content of C and N. The total content of Ti and Nb is preferably 10 times or more as much as the total content of C and N. Further, the total content of Ti and Nb is preferably 25 times or less.

Si: Si is useful as a deoxidizing element in a refining step, and is contained with a lower limit of 0.01%. The lower limit of the content of Si is preferably 0.10%. Further, a large amount of Si deteriorates workability and thus should not be contained. The upper limit of the content of Si is preferably limited to 0.80%. The upper limit of the content of Si is preferably 0.50%.

Mn: 0.01% or more of Mn is contained as a deoxidizing element and an element for fixing S. However, a large amount of Mn deteriorates workability and thus should not be contained. The upper limit of the content of Mn is preferably limited to 0.80%. The lower limit of the content of Mn is preferably 0.10%. The upper limit of the content of Mn is preferably 0.50%.

P: P is an impurity element that significantly deteriorates workability. Therefore, the content of P is preferably at a level as low as possible. The upper limit of an allowable content of P is 0.050%. The upper limit value of a preferable content of P is 0.030%. The lower limit value of S is not particularly specified, but is preferably 0.010% considering refining cost.

S: S is an impurity element that deteriorates corrosion resistance. Therefore, the content of S is preferably at a level as low as possible. The upper limit of an allowable content of S is 0.010%. The upper limit value of a preferable content of S is 0.0050%. The lower limit value of S is not particularly specified, but is preferably 0.0005% considering refining cost.

Al: Al is useful as a deoxidizing element, and 0.010% or more of Al is contained. However, a large amount of Al should not be contained because of deteriorating workability, and the upper limit is preferably limited to 0.100%. The upper limit of the content of Al is preferably 0.080%.

Mo: Mo is an element which exhibits an effect for repairing a passive state film, is very effective for improving rust resistance and corrosion retardation, and particularly improves pitting corrosion resistance in combination with Cr. An increase in the content of Mo improves corrosion resistance but, simultaneously, results in deterioration in workability and increase in cost. Accordingly, the upper limit of the content of Mo, which needs to be more than 0.3%, is set at 1.5%. The lower limit of the content of Mo is preferably 0.6%. The upper limit of the content of Mo is preferably 1.1%.

In addition to the above elements, the following alloy elements may be contained in order to adjust various characteristics of steel.

B: B is an element useful for preventing secondary working embrittlement or hot workability deterioration without affecting corrosion resistance. Therefore, B is contained with a lower limit of 0.0002%. However, the content of more than 0.0050% deteriorates hot workability, and therefore the upper limit of B is preferably 0.0050%. The upper limit of the content of B is more preferably 0.0020%.

Sn: Sn is an element useful for improving corrosion resistance with a small content thereof, and is contained within such a range as not to impair inexpensiveness. When the content of Sn is less than 0.01%, an effect of improving corrosion resistance is not exhibited. When the content is more than 0.50%, cost is significantly increased and workability is deteriorated. Therefore, a proper range of the content is from 0.01% to 0.50%. The lower limit of the content of Sn is preferably 0.05%. The upper limit of the content of Sn is preferably 0.30%.

In addition to the above elements, the following elements may be contained within such a range as not to impair the effect of the invention.

Cu, Ni: Cu and Ni slow a corrosion rate when corrosion progresses, and the content of Cu and Ni is preferably from 0.01% to 0.5%. However, an excessive content thereof deteriorates workability, and therefore the upper limit of the content of Cu and Ni is preferably 0.3%.

Sb, Zr, Co, W: Sb, Zr, Co, or W improves corrosion resistance, and therefore can be added, as necessary. These elements are important for slowing a corrosion rate. However, an excessive content thereof deteriorates manufacturability and cost. Therefore, the range of Sb, Zr, Co or W content is from 0.005% to 0.5%. A more preferable lower limit of the content of any of these elements is 0.05%. A more preferable upper limit is 0.4%.

V: V improves crevice corrosion resistance, and therefore can be added, as necessary. However, an excessive content of V deteriorates workability and saturates an effect for improving corrosion resistance. Therefore, the lower limit of the V content is 0.03%, and the upper limit of the V content is 0.5%. A more preferable lower limit is 0.05%. A more preferable upper limit is from 0.30%.

Ga, Ta: Ga or Ta is an element that contributes to improving corrosion resistance and workability, and can be contained in an amount of 0.001% to 0.05%.

Stainless steel having the above composition is manufactured as a steel sheet by a typical method for manufacturing a stainless steel sheet, including: melting and refining a steel piece in a converter or an electric furnace; and subjecting the steel piece to hot rolling, pickling, cold rolling, annealing, finish pickling, and the like. Incidentally, hot rolled plate annealing may be additionally performed after the hot rolling as needed. Further, such a steel sheet is usable as a material to manufacture a welded pipe by a typical method for manufacturing a stainless steel pipe, such as electric resistance welding, TIG welding, or laser welding.

The stainless steel pipe is formed into an oil filler pipe through typical molding and assembling steps such as cold plastic working (for example, bending, expanding, or drawing), or attachment of various metal fittings by welding (for example, spot welding, projection welding, MIG welding, or TIG welding), brazing, or bolts and nuts.

Incidentally, an aluminized stainless steel sheet as a material for the metal fitting is preferably a ferritic stainless steel of the same composition range as a material for the steel pipe member except that the Mo content ranges from 0.005% to 1.5%, but does not need to be at least a highly corrosion-resistant material having a larger alloy content than one for the steel pipe member.

Mo contained in the material for the metal fitting, which is an element that exhibits an effect for repairing a passive state film and is very effective for improving rust resistance and corrosion retardation, particularly improves pitting corrosion resistance in combination with Cr. An increase in the content of Mo results in improving the corrosion resistance. When contained in the material for the component to be plated, Mo, the lower limit of which is set smaller than that of the non-plated ferritic stainless steel member in an expectation of an additional corrosion prevention effect by plating, should necessarily be 0.005% or more. However, since an extreme addition of Mo deteriorates workability and increases the costs, the upper limit is set at 1.5%. The upper limit is preferably 0.60% in terms of costs. The upper limit is preferably 0.30% for use not in a severe chloride environment.

The content(s) of the component(s) other than Mo in the material for the metal fitting is determined on the same grounds as ones for determining the content(s) of the component(s) for the steel pipe member.

EXAMPLES

Exemplary embodiment(s) of the invention will be described in detail below with reference to Examples. Initially, the components of the ferritic stainless steel, the Al-plating weight per unit area of the aluminized stainless steel sheet, and the thickness of the cation electrodeposition coating film will be described.

150 kg of ferritic stainless steel having the composition shown in Table 1-1 and Table 1-2 was melted in a vacuum furnace, was cast into a 50 kg steel ingot, and then was subjected to the steps of hot rolling, hot rolled plate annealing, pickling-cold rolling, annealing, and finishing pickling to manufacture a steel sheet having a thickness of 0.8 mm. A large plate having a size of t0.8×70×150 mm was taken from this steel sheet material. The large plate simulated the member or the steel pipe member (oil filler pipe itself). In Table 1-2, Nos. X8, X9, X10, and X12 each contained an excessive amount of Si, Mn, P, and Al, and caused edge cracking during cold rolling. Therefore, the workability thereof was determined to be insufficient, and these samples were not subjected to the subsequent test for corrosion resistance.

Ferritic stainless steel having the composition shown in Table 2 was melted in a converter, and then was subjected to the steps of casting, hot rolling, hot rolled plate annealing, pickling, cold rolling, annealing, finishing pickling and hot-dip Al-plating to manufacture an aluminized stainless steel sheet having a thickness of 0.8 mm. A small plate having a size of t0.8×40×40 mm was taken from this aluminized stainless sheet plate material. The small plate simulated the metal fitting.

A gap test piece was manufactured by overlaying the small plate on the large plate and subjecting the central part the small plate and the large plate to one point spot welding. The gap is defined around a part at which the large plate faces and contacts the small plate.

The gap test piece was subjected to cation electrodeposition coating and then to a salt corrosion test. In cation electrodeposition coating, PN-110 manufactured by NIPPONPAINT Co., Ltd. was used as a coating material, electrification was performed at a bath temperature of 28 degrees C. and a coating voltage of 170 V, and conditions were selected such that the thickness of a coating film was from 2 μm to 40 μm in the general part. A baking condition was 170 degrees C.×20 minutes. The thicknesses of a coating film at five points were measured per a sample using an electromagnetic film thickness meter, and an average value thereof was used as a film thickness. The gap of the gap test piece had a very small opening amount except No. 40. Therefore, an electrodeposition coating film was not formed in the gap, a stainless steel basic material was exposed in the gap of the large plate, and an aluminized film was exposed in the gap of the small plate.

As a test for evaluating salt corrosion resistance of these gap test pieces, a compound cyclic corrosion test in a JASO mode (cyclic corrosion test regulated by JASO-M609-91 (repetition of spraying salt water: spraying 5% NaCl, 35 degrees C.×2 Hr, drying: relative humidity 20%, 60 degrees C.×4 Hr, and wetting: relative humidity 90%, 50 degrees C.×2 Hr)) was used. As a test period, 500 cycles were performed. After the test was finished, a gap test piece was dismantled by punching a weld nugget, and was subjected to a rust removing treatment. Thereafter, the corrosion depth in the gap of the large plate was measured by a focal depth method with a microscope. The thicknesses at ten points were measured per a test piece, and a maximum value of the measurements was used as a representative value of the sample. A target (satisfactory) corrosion resistance was defined at a maximum corrosion depth of being less than a half the plate thickness (400 μm).

Test standards and test results are shown in Table 3-1 and Table 3-2.

TABLE 1-1

Chemical Components of Large Plate (mass %)

| Sec. | No. | C | Si | Mn | P | S | Al | Cr | Mo | Ti | Nb | N | Others | Notes |
|---|---|---|---|---|---|---|---|---|---|---|---|---|---|---|
| The Invention | E01 | 0.0038 | 0.41 | 0.70 | 0.040 | 0.0100 | 0.028 | 16.17 | 0.74 | 0.125 | 0.114 | 0.0119 | — | |
| | E02 | 0.0053 | 0.16 | 0.23 | 0.022 | 0.0069 | 0.075 | 12.90 | 1.13 | 0.064 | 0.242 | 0.0085 | 0.3Ni | |
| | E03 | 0.0069 | 0.11 | 0.15 | 0.040 | 0.0062 | 0.037 | 12.26 | 0.52 | 0.293 | 0.160 | 0.0119 | — | |
| | E04 | 0.0072 | 0.26 | 0.64 | 0.043 | 0.0013 | 0.030 | 14.39 | 0.53 | 0.282 | 0.115 | 0.0096 | — | |
| | E05 | 0.0031 | 0.34 | 0.60 | 0.041 | 0.0026 | 0.091 | 17.07 | 1.19 | — | 0.234 | 0.0103 | 0.0006B | |
| | E06 | 0.0029 | 0.38 | 0.18 | 0.046 | 0.0078 | 0.056 | 13.37 | 1.07 | — | 0.280 | 0.0043 | — | |
| | E07 | 0.0041 | 0.19 | 0.70 | 0.043 | 0.0088 | 0.071 | 16.03 | 0.51 | 0.116 | — | 0.0144 | 0.13Sn | |
| | E08 | 0.0036 | 0.23 | 0.78 | 0.011 | 0.0068 | 0.045 | 11.29 | 0.81 | — | 0.291 | 0.0052 | — | |
| | E09 | 0.0011 | 0.31 | 0.29 | 0.050 | 0.0043 | 0.083 | 11.16 | 0.60 | 0.091 | 0.169 | 0.0056 | 0.05Sn | |
| | E10 | 0.0036 | 0.02 | 0.79 | 0.008 | 0.0076 | 0.043 | 10.88 | 0.91 | 0.226 | — | 0.0046 | 0.07Sn—0.0013B | |
| | E11 | 0.0139 | 0.21 | 0.21 | 0.013 | 0.0060 | 0.018 | 15.39 | 1.23 | 0.131 | 0.253 | 0.0094 | — | |
| | E12 | 0.0017 | 0.18 | 0.33 | 0.028 | 0.0023 | 0.032 | 15.38 | 1.35 | 0.055 | 0.110 | 0.0036 | — | |
| | E13 | 0.0043 | 0.16 | 0.36 | 0.006 | 0.0098 | 0.013 | 11.36 | 0.61 | 0.068 | 0.193 | 0.0129 | 0.05Sn—0.0042B | |
| | E14 | 0.0036 | 0.64 | 0.63 | 0.043 | 0.0040 | 0.011 | 14.20 | 0.80 | 0.226 | 0.172 | 0.0140 | 0.11Sn | |
| | E15 | 0.0021 | 0.29 | 0.74 | 0.009 | 0.0057 | 0.017 | 12.89 | 0.79 | 0.039 | 0.067 | 0.0017 | 0.01Cu | |
| | E16 | 0.0057 | 0.34 | 0.47 | 0.015 | 0.0051 | 0.054 | 13.03 | 0.32 | 0.091 | — | 0.0024 | — | |
| | E17 | 0.0067 | 0.54 | 0.04 | 0.004 | 0.0088 | 0.073 | 16.95 | 1.20 | 0.135 | 0.200 | 0.0091 | 0.1Zr | |
| | E18 | 0.0061 | 0.68 | 0.55 | 0.012 | 0.0053 | 0.053 | 12.19 | 1.02 | 0.243 | 0.016 | 0.0101 | 0.1V | |
| | E19 | 0.0041 | 0.31 | 0.46 | 0.018 | 0.0096 | 0.010 | 17.83 | 0.55 | 0.031 | 0.188 | 0.0050 | — | |
| | E20 | 0.0030 | 0.08 | 0.20 | 0.013 | 0.0075 | 0.016 | 17.22 | 1.34 | 0.125 | 0.160 | 0.0090 | 0.1W | |
| | E21 | 0.0027 | 0.28 | 0.57 | 0.028 | 0.0037 | 0.096 | 12.03 | 1.26 | 0.206 | 0.241 | 0.0033 | — | |
| | E22 | 0.0064 | 0.36 | 0.58 | 0.017 | 0.0081 | 0.016 | 16.52 | 0.46 | 0.247 | 0.297 | 0.0008 | 0.02Sb | |
| | E23 | 0.0040 | 0.33 | 0.39 | 0.036 | 0.0058 | 0.057 | 15.77 | 1.00 | 0.256 | 0.211 | 0.0054 | — | |
| | E24 | 0.0039 | 0.71 | 0.55 | 0.009 | 0.0096 | 0.080 | 11.43 | 1.11 | 0.147 | 0.154 | 0.0148 | 0.0021Ga | |

TABLE 1-2

Chemical Components of Large Plate (mass %)

| Sec. | No. | C | Si | Mn | P | S | Al | Cr | Mo | Ti | Nb | N | Others | Notes |
|---|---|---|---|---|---|---|---|---|---|---|---|---|---|---|
| The Invention | E25 | 0.0049 | 0.25 | 0.77 | 0.037 | 0.0034 | 0.031 | 16.93 | 0.75 | — | 0.261 | 0.0073 | — | |
| | E26 | 0.0064 | 0.36 | 0.69 | 0.020 | 0.0058 | 0.081 | 12.66 | 1.49 | 0.143 | 0.300 | 0.0037 | — | |
| | E27 | 0.0055 | 0.04 | 0.21 | 0.013 | 0.0076 | 0.053 | 11.74 | 0.73 | 0.290 | — | 0.0069 | — | |
| | E28 | 0.0041 | 0.63 | 0.20 | 0.029 | 0.0067 | 0.016 | 12.19 | 1.41 | 0.245 | 0.281 | 0.0117 | 0.03Co | |
| | E29 | 0.0062 | 0.47 | 0.19 | 0.032 | 0.0096 | 0.050 | 15.05 | 1.38 | 0.175 | 0.250 | 0.0121 | — | |
| | E30 | 0.0014 | 0.49 | 0.32 | 0.006 | 0.0013 | 0.054 | 13.27 | 0.85 | 0.026 | 0.231 | 0.0035 | 0.03Ta | |
| | E31 | 0.0028 | 0.10 | 0.09 | 0.021 | 0.0011 | 0.069 | 17.15 | 1.15 | 0.211 | — | 0.0067 | — | SUS436L |
| Comparative Examples | X01 | 0.0036 | 0.75 | 0.56 | 0.033 | 0.0087 | 0.037 | 10.88 | 0.10 | 0.153 | 0.159 | 0.0112 | — | |
| | X02 | 0.0047 | 0.65 | 0.43 | 0.041 | 0.0027 | 0.081 | 9.21 | 0.46 | 0.288 | 0.224 | 0.0007 | — | |
| | X03 | 0.0184 | 0.57 | 0.44 | 0.002 | 0.0097 | 0.067 | 10.66 | 0.68 | 0.155 | 0.167 | 0.0016 | — | |
| | X04 | 0.0068 | 0.77 | 0.09 | 0.005 | 0.0015 | 0.033 | 12.02 | 1.00 | 0.066 | 0.133 | 0.0320 | — | |
| | X05 | 0.0042 | 0.66 | 0.69 | 0.028 | 0.0040 | 0.083 | 16.07 | 1.16 | — | — | 0.0139 | — | |
| | X06 | 0.0036 | 0.09 | 0.56 | 0.030 | 0.0096 | 0.039 | 16.91 | 0.53 | 0.556 | 0.121 | 0.0059 | — | |
| | X07 | 0.0041 | 0.17 | 0.68 | 0.033 | 0.0021 | 0.028 | 10.83 | 1.36 | 0.232 | 0.543 | 0.0034 | — | |
| | X08 | 0.0039 | 1.09 | 0.41 | 0.046 | 0.0031 | 0.047 | 10.89 | 1.31 | 0.201 | — | 0.0016 | — | |
| | X09 | 0.0034 | 0.61 | 1.02 | 0.019 | 0.0052 | 0.097 | 13.12 | 0.66 | 0.097 | 0.261 | 0.0029 | — | |
| | X10 | 0.0069 | 0.62 | 0.30 | 0.104 | 0.0047 | 0.039 | 16.02 | 0.39 | 0.254 | 0.171 | 0.0127 | — | |
| | X11 | 0.0071 | 0.32 | 0.16 | 0.010 | 0.0171 | 0.032 | 12.61 | 1.29 | 0.215 | 0.117 | 0.0068 | — | |
| | X12 | 0.0069 | 0.77 | 0.24 | 0.016 | 0.0072 | 0.154 | 15.29 | 1.06 | 0.132 | 0.257 | 0.0081 | — | |
| | X13 | 0.0066 | 0.49 | 0.25 | 0.040 | 0.0031 | 0.072 | 12.65 | 0.87 | 0.039 | 0.520 | 0.0000 | — | |
| | X14 | 0.0021 | 0.70 | 0.41 | 0.023 | 0.0011 | 0.062 | 15.79 | 1.42 | 0.521 | 0.037 | 0.0043 | — | |
| | X15 | 0.0017 | 0.24 | 0.67 | 0.008 | 0.0046 | 0.097 | 15.58 | 1.43 | 0.029 | 0.017 | 0.0141 | — | | underlined: outside the scope of the invention

TABLE 2

| | | Chemical Components of Small Plate (mass %) | | | | | | | | | | | Al-plating Weight per Unit Area | |
|---|---|---|---|---|---|---|---|---|---|---|---|---|---|---|
| Sec. | No. | C | Si | Mn | P | S | Al | Cr | Mo | Ti | Nb | N | Others | (g/m$^2$) | Notes |
| The Invention | A1 | 0.003 | 0.11 | 0.25 | 0.017 | 0.0008 | 0.052 | 10.70 | — | 0.201 | — | 0.0062 | — | 147 | |
| | A2 | 0.004 | 0.10 | 0.35 | 0.019 | 0.0011 | 0.049 | 10.75 | 0.73 | 0.198 | — | 0.0065 | — | 22 | |
| | A3 | 0.003 | 0.10 | 0.35 | 0.020 | 0.0010 | 0.050 | 11.02 | 1.34 | 0.199 | — | 0.0065 | — | 49 | |
| | A4 | 0.004 | 0.10 | 0.35 | 0.021 | 0.0008 | 0.049 | 17.17 | 1.03 | 0.200 | — | 0.0065 | — | 112 | |

TABLE 2-continued

| Sec. | No. | C | Si | Mn | P | S | Al | Cr | Mo | Ti | Nb | N | Others | Al-plating Weight per Unit Area (g/m²) | Notes |
|---|---|---|---|---|---|---|---|---|---|---|---|---|---|---|---|
| | A5 | 0.004 | 0.10 | 0.35 | 0.022 | 0.0010 | 0.051 | 11.45 | 0.34 | 0.198 | — | 0.0065 | — | 69 | |
| | A6 | 0.003 | 0.10 | 0.08 | 0.019 | 0.0009 | 0.049 | 14.01 | 0.01 | — | 0.167 | 0.0068 | 0.10Sn | 57 | |
| | A7 | 0.004 | 0.09 | 0.27 | 0.020 | 0.0021 | 0.035 | 17.01 | — | 0.198 | — | 0.0086 | — | 35 | |
| | A8 | 0.004 | 0.10 | 0.09 | 0.021 | 0.0011 | 0.069 | 17.37 | 0.51 | 0.211 | — | 0.0067 | — | 70 | |
| Comparative Examples | D1 | 0.003 | 0.15 | 0.09 | 0.021 | 0.0011 | 0.069 | 17.15 | 0.34 | 0.211 | — | 0.0067 | — | <u>17</u> | |
| | D2 | 0.003 | 0.10 | 0.25 | 0.020 | 0.0009 | 0.061 | 14.01 | 0.69 | 0.190 | 0.170 | 0.0069 | — | <u>10</u> | |
| | D3 | 0.004 | 0.10 | 0.09 | 0.021 | 0.0011 | 0.069 | 11.05 | — | 0.211 | — | 0.0067 | — | <u>16</u> | |
| | D4 | 0.003 | 0.10 | 0.09 | 0.021 | 0.0011 | 0.069 | 11.12 | 0.28 | 0.211 | — | 0.0067 | — | <u>14</u> | |
| | D5 | 0.004 | 0.10 | 0.09 | 0.021 | 0.0011 | 0.069 | 10.81 | 1.40 | 0.184 | — | 0.0067 | — | <u>186</u> | | underlined: outside the scope of the invention

TABLE 3-1

| Sec. | No. | Material of Large Plate | Material of Small Plate | Plating Weight per Unit Area of Small Plate (g/m²) | Thickness of Electrodeposition Coating Film (μm) | Maximum Corrosion Depth (μm) | Notes |
|---|---|---|---|---|---|---|---|
| The invention | 1 | E01 | A3 | 49 | 14 | 154 | |
| | 2 | E02 | A3 | 49 | 19 | 293 | |
| | 3 | E03 | A3 | 49 | 10 | 369 | |
| | 4 | E04 | A3 | 49 | 12 | 165 | |
| | 5 | E05 | A3 | 49 | 29 | 123 | |
| | 6 | E06 | A2 | 22 | 31 | 339 | |
| | 7 | E07 | A3 | 49 | 10 | 238 | |
| | 8 | E08 | A2 | 22 | 15 | 297 | |
| | 9 | E09 | A2 | 22 | 22 | 319 | |
| | 10 | E10 | A2 | 22 | 34 | 263 | |
| | 11 | E11 | A3 | 49 | 33 | 193 | |
| | 12 | E12 | A2 | 22 | 29 | 123 | |
| | 13 | E13 | A2 | 22 | 14 | 326 | |
| | 14 | E14 | A2 | 22 | 32 | 306 | |
| | 15 | E06 | A1 | 147 | 12 | 123 | |
| | 16 | E06 | A2 | 22 | 11 | 359 | |
| | 17 | E06 | A4 | 112 | 34 | 162 | |
| | 18 | E06 | A5 | 69 | 29 | 267 | |
| | 19 | E06 | A6 | 57 | 16 | 297 | |
| | 20 | E06 | A7 | 35 | 13 | 312 | |
| | 21 | E06 | A8 | 70 | 8 | 349 | |
| | 22 | E06 | A1 | 147 | 25 | 359 | |
| | 23 | E09 | A4 | 112 | 13 | 342 | |
| | 24 | E15 | A3 | 49 | 17 | 320 | |
| | 25 | E16 | A3 | 49 | 31 | 368 | |
| | 26 | E17 | A3 | 49 | 11 | 164 | |
| | 27 | E18 | A3 | 49 | 14 | 276 | |
| | 28 | E19 | A3 | 49 | 11 | 123 | |
| | 29 | E20 | A3 | 49 | 32 | 182 | |
| | 30 | E21 | A3 | 49 | 34 | 249 | |
| | 31 | E22 | A3 | 49 | 32 | 237 | |
| | 32 | E23 | A3 | 49 | 12 | 354 | |
| | 33 | E24 | A3 | 49 | 7 | 241 | |
| | 34 | E25 | A3 | 49 | 27 | 161 | |
| | 35 | E26 | A3 | 49 | 25 | 268 | |
| | 36 | E27 | A3 | 49 | 30 | 160 | |
| | 37 | E28 | A3 | 49 | 32 | 297 | |
| | 38 | E29 | A3 | 49 | 31 | 116 | |
| | 39 | E30 | A3 | 49 | 21 | 183 | |
| | 40 | E01 | A3 | 49 | 33 | 359 | large opening amount |

TABLE 3-2

| Sec. | No. | Material of Large Plate | Material of Small Plate | Plating Weight per Unit Area of Small Plate (g/m²) | Thickness of Electrodeposition Coating Film (μm) | Maximum Corrosion Depth (μm) | Notes |
|---|---|---|---|---|---|---|---|
| Comparative Examples | 101 | E01 | A1 | 147 | <u>1</u> | 601 | |
| | 102 | E02 | A5 | 69 | <u>3</u> | 512 | |
| | 103 | E03 | A4 | 112 | <u>4</u> | 556 | |
| | 104 | E04 | A7 | 35 | <u>2</u> | 600 | |
| | 105 | E05 | A7 | 35 | <u>1</u> | 713 | |
| | 106 | E06 | A7 | 35 | <u>3</u> | 421 | |
| | 107 | E07 | A7 | 35 | <u>2</u> | 685 | |
| | 108 | E08 | A5 | 69 | <u>1</u> | 789 | |
| | 109 | E09 | A7 | 35 | <u>2</u> | 759 | |
| | 110 | E10 | A2 | 22 | <u>3</u> | 744 | |
| | 111 | E11 | A7 | 35 | <u>1</u> | 799 | |
| | 112 | E06 | <u>D1</u> | <u>17</u> | 27 | 516 | |
| | 113 | E06 | <u>D2</u> | <u>10</u> | 21 | 494 | |
| | 114 | E06 | <u>D3</u> | <u>16</u> | 26 | 450 | |
| | 115 | E06 | <u>D4</u> | <u>14</u> | 14 | 635 | |
| | 116 | E06 | <u>D5</u> | <u>186</u> | 21 | 156 | equivalent to Nos. 12, 14 |
| | 117 | E06 | A7 | 35 | <u>59</u> | 132 | equivalent to No. 17 |
| | 118 | <u>X02</u> | A7 | 35 | 32 | 565 | |
| | 119 | <u>X03</u> | A7 | 35 | 5 | 698 | |
| | 120 | <u>X04</u> | A7 | 35 | 26 | 749 | |
| | 121 | <u>X05</u> | A7 | 35 | 24 | 513 | |
| | 122 | <u>X06</u> | A7 | 35 | 34 | 149 | equivalent to No. 17 |
| | 123 | <u>X07</u> | A3 | 49 | 7 | 184 | equivalent to No. 7 |
| | 124 | <u>X11</u> | A8 | 70 | 8 | 750 | |
| | 125 | <u>X13</u> | A1 | 147 | 21 | 167 | equivalent to No. 11 |
| | 126 | <u>X14</u> | A6 | 57 | 23 | 193 | equivalent to No. 1 |
| | 127 | <u>X15</u> | A3 | 49 | 8 | 752 | |
| | 128 | E31 | E31 | — | 40 | 671 | |
| Reference Example | 129 | E01 | A7 | <u>12</u> | 36 | 325 | large opening amount | underlined: outside the scope of the invention

All of Nos. 1 to 39 in Examples of the invention had a maximum corrosion depth of 400 μm or less, and was excellent. No. 40 had the same condition as No. 1, but had an opening amount of the gap of 0.2 mm, which was intentionally enlarged. The opening was formed based on the method described in paragraph [0042] of Patent Literature 4. Under the above condition, a coating film was also formed in the gap, but the gap of the large plate was covered with an electrodeposition coating. As a result, excellent corrosion resistance could be assured.

Comparative Example No. 128 shows the results of the test where SUS436L was used as a material and the small plate was not aluminized. Both the large plate and the small plate were made of E31 (SUS436L), and were subjected to electrodeposition coating. However, crevice corrosion reached the plate thickness, proving that this corrosion test was sufficiently severe. No. 129 (Reference Example) had a large opening amount of the gap. The opening was formed based on the method described in paragraph [0042] of Patent Literature 4. The gap opening amount was 0.2 mm. As a result of formation of a coating film also in the gap, the Al-plating weight per unit area was outside the range of the invention (lower than the lower limit). However, it was demonstrated that necessary corrosion resistance could be assured as a result of coverage of the gap by electrodeposition coating.

Even in such a corrosion test, Nos. 1 to 39 in the invention exhibited satisfactory corrosion resistance due to the sacrificial protection performance of Al-plating and the Al consumption reduction performance by the electrodeposition coating film.

In contrast, Comparative Examples Nos. 101 to 111 each had an insufficient thickness of an electrodeposition coating film, and Comparative Examples Nos. 112 to 115 each had an insufficient Al-plating weight per unit area. Accordingly, these Comparative Examples did not exhibit satisfactory corrosion resistance. Comparative Examples Nos. 118 to 121, 124, and 127 each had a composition of the large plate outside the range of the invention, and therefore exhibited insufficient corrosion resistance. Though Comparative Example No. 116 had an excessive Al-plating weight per unit area resulting in a high cost, Comparative Example No. 116 only exhibited corrosion resistance equivalent to Nos. 12 and 14 in the invention having a smaller adhesion amount. Though Comparative Example No. 117 had an excessive thickness of an electrodeposition coating film resulting in a high cost, Comparative Example No. 117 only exhibited corrosion resistance equivalent to No. 17 in the invention having a smaller film thickness. Comparative Examples Nos. 122, 123, 125, and 126 each had an excessive content of Ti or Nb as a material of the large plate resulting in a high cost, but only exhibited corrosion resistance equivalent to Nos. 17, 7, 11, and 1 in the invention using a material having the same content of Cr and a smaller content of Ti or Nb.

An attachment structure of an aluminized stainless steel metal fitting to a ferritic stainless steel pipe member will be described.

150 kg of ferritic stainless steel having the composition shown in E01 of Table 1-1 was melted in a vacuum furnace, was cast into a 50 kg steel ingot, and then was subjected to the steps of hot rolling, hot rolled plate annealing, pickling-cold rolling, annealing, and finishing pickling to manufacture a steel sheet having a thickness of 0.8 mm. Using this steel sheet material, a steel pipe having a size of φ50×50×t0.8 mm was manufactured by seam welding to obtain the ferritic stainless steel pipe 21. The ferritic stainless steel pipe 21 simulated an inlet pipe. Ferritic stainless steel having the composition shown in A3 of Table 2 was melted in a converter, and then was subjected to the steps of casting, hot rolling, hot rolled plate annealing, pickling, cold rolling, annealing, finishing pickling and hot-dip Al-plating to manufacture an aluminized stainless steel sheet having a thickness of 0.8 mm. The Al-plating weight per unit area was 49 g/cm². Using this aluminized stainless steel sheet material, parts having sizes of φ48×50×t0.8 mm and φ52×50×t0.8 mm were manufactured by punching and press molding to obtain the aluminized stainless steel pipes 22. The aluminized stainless steel pipe 22 simulated a metal fitting.

As illustrated in FIGS. 4A and 5A, using the three types of steel pipes manufactured, the aluminized stainless steel pipe 22 was welded to an outside or an inside of the ferritic stainless steel pipe 21 at the attachment position 27 along an outer periphery 0 mm to 20 mm apart from an end 26 of the ferritic stainless steel pipe 21 by four point spot welding (welded part 24) to manufacture a test piece. A gap 23 is defined at a part at which the ferritic stainless steel pipe 21 faces the aluminized stainless steel pipe 22 to be in contact therewith.

The test piece was subjected to cation electrodeposition coating. In cation electrodeposition coating, PN-110 manufactured by NIPPONPAINT Co., Ltd. was used as a coating material, electrification was performed at a bath temperature of 28 degrees C. and a coating voltage of 170 V, and conditions were selected such that the thickness of a coating film was from 30 μm in the general part. A baking condition was 170 degrees C.×20 minutes. The thicknesses of a coating film at five points were measured per a sample using an electromagnetic film thickness meter, and an average value thereof was used as a film thickness. The gap 23 of the gap test piece had a very small opening amount. Therefore, an electrodeposition coating film was not formed in the gap 23, a stainless steel basic material was exposed in the gap of the ferritic stainless steel pipe 21, and an aluminized film was exposed in the gap of the aluminized stainless steel pipe 22.

As illustrated in FIGS. 4B and 5B, insides of two parts of an upper part and a lower part in the steel pipe were sealed with the silicone caps 25, and each of these gap test pieces was subjected to a salt corrosion test at an attitude tilted by 45°. As a test for evaluating salt corrosion resistance, a compound cyclic corrosion test in a JASO mode (cyclic corrosion test regulated by JASO-M609-91 (repetition of spraying salt water: spraying 5% NaCl, 35 degrees C.×2 Hr, drying: relative humidity 20%, 60 degrees C.×4 Hr, and wetting: relative humidity 90%, 50 degrees C.×2 Hr)) was used. As a test period, 500 cycles were performed. After the test was finished, the silicone caps were removed, and whether or not an Al corrosion product invaded the ferritic stainless steel pipe was checked.

Test standards and test results are shown in Table 4. None of the test pieces did not have a hole in the ferritic stainless steel pipe. In other words, all of Examples of the invention and Reference Examples shown in Table 4 exhibit the effect of the invention.

TABLE 4

| Sec. | No. | Structure | Attachment Position (mm) | Invasion of Al into Steel Pipe |
|---|---|---|---|---|
| The Invention | a | I | 5 | not observed |
|  | b | I | 10 | not observed |

TABLE 4-continued

| Sec. | No. | Structure | Attachment Position (mm) | Invasion of Al into Steel Pipe |
|---|---|---|---|---|
|  | c | I | 15 | not observed |
|  | d | I | 20 | not observed |
| Reference Examples | 1a | I | 0 | observed |
|  | 1b | I | 3 | observed |
|  | 1c | II | 0 | observed |
|  | 1d | II | 5 | observed |
|  | 1e | II | 10 | observed |
|  | 1f | II | 15 | observed |
|  | 1g | II | 20 | observed |

Each of Nos. a to d in Examples of the invention had structure I with the attachment position 27 of 5 mm or more from the end 26 of the ferritic stainless steel pipe. In any one of Nos. a to d, invasion of an Al corrosion product into the ferritic stainless steel pipe could not be observed.

Each of Nos. 1a and 1b (Reference Examples) had the structure I with the attachment position 27 of less than 5 mm from the end 26 of the ferritic stainless steel pipe. An end surface of the steel pipe was corroded due to a liquid reservoir, and an Al corrosion product invaded the ferritic stainless steel pipe from a gap between the end and the silicone cap. Comparative Examples 1c to 1g had the structure II. An Al corrosion product invaded the ferritic stainless steel pipe from a worn aluminized part.

By such a corrosion test, it could be confirmed that Nos. a to d in Examples of the invention exhibited satisfactory corrosion resistance due to a sacrificial protection performance of Al-plating and an Al consumption reduction performance of an electrodeposition coating film and causes no invasion of an Al corrosion product into the ferritic stainless steel pipe.

The invention claimed is:

1. An automotive member comprising:
 a non-aluminized member made of a material comprising a ferritic stainless steel comprising, in mass %, at most 0.015% of C, at most 0.015% of N, 10.5% to 18.0% of Cr, 0.01% to 0.80% of Si, 0.01% to 0.80% of Mn, at most 0.050% of P, at most 0.010% of S, 0.010% to 0.100% of Al, more than 0.3% to 1.5% of Mo, one or both of at most 0.30% of Ti and at most 0.30% of Nb with a proviso that both of Ti and Nb are not less than 0.03%, and a balance in a form of Fe and inevitable impurities; and
 a metal fitting made of an aluminized stainless steel sheet having an Al-plating weight per unit area ranging from 20 g/m² to 150 g/m², wherein
 the metal fitting is attached to the non-aluminized member by welding or brazing to define a gap structure, which is to be exposed to a chloride environment, between the member and the metal fitting, and
 the metal fitting and the non-aluminized member are coated with a cation electrodeposition coating film having a thickness of 5 μm to 35 μm.

2. The automotive member according to claim 1, wherein the material for the member further comprises at least one of a first group and a second group, the first group consisting of, in mass, at least one of 0.0002% to 0.0050% of B and 0.01% to 0.50% of Sn, the second group consisting of, in mass %, one or more of 0.01% to 0.5% of Cu, 0.01% to 0.5% of Ni, 0.005% to 0.5% of Sb, 0.005% to 0.5% of Zr, 0.005% to 0.5% of Co, 0.005% to 0.5% of W, 0.03% to 0.5% of V, 0.001% to 0.05% of Ga and 0.001% to 0.05% of Ta.

3. The automotive member according to claim 1, wherein a material for the metal fitting comprises a ferritic stainless steel of the same composition range as the material for the non-aluminized member except that the Mo content ranges from 0.005 mass % to 1.5 mass %.

4. An oil filler pipe comprising:
a non-aluminized steel pipe member made of a steel pipe of a material comprising a ferritic stainless steel comprising, in mass %, at most 0.015% of C, at most 0.015% of N, 10.5% to 18.0% of Cr, 0.01% to 0.80% of Si, 0.01% to 0.80% of Mn, at most 0.050% of P, at most 0.010% of S, 0.010% to 0.100% of Al, more than 0.3% to 1.5% of Mo, one or both of at most 0.30% of Ti and at most 0.30% of Nb with a proviso that both of Ti and Nb are not less than 0.03%, and a balance in a form of Fe and inevitable impurities; and
a metal fitting made of an aluminized stainless steel sheet having an Al-plating weight per unit area ranging from 20 g/m² to 150 g/m², wherein
the metal fitting is attached to an outer circumferential surface of the non-aluminized steel pipe member by welding or brazing at a position not in contact with a fuel to define a gap structure, which is to be exposed to a chloride environment, between the non-aluminized member and the metal fitting, and
the metal fitting and the non-aluminized steel pipe member are coated with a cation electrodeposition coating film having a thickness of 5 µm to 35 µm.

5. The oil filler pipe according to claim 4, wherein the material for the steel pipe member further comprises at least one of a first group and a second group, the first group consisting of, in mass, at least one of 0.0002% to 0.0050% of B and 0.01% to 0.50% of Sn, the second group consisting of, in mass %, one or more of 0.01% to 0.5% of Cu, 0.01% to 0.5% of Ni, 0.005% to 0.5% of Sb, 0.005% to 0.5% of Zr, 0.005% to 0.5% of Co, 0.005% to 0.5% of W, 0.03% to 0.5% of V, 0.001% to 0.05% of Ga and 0.001% to 0.05% of Ta.

6. The oil filler pipe according to claim 4, wherein a material for the metal fitting comprises a ferritic stainless steel of the same composition range as the material for the steel pipe member except that the Mo content ranges from 0.005 mass % to 1.5 mass %.

7. The oil filler pipe according to claim 4, wherein an oil inlet structure is defined, in which the steel pipe member is an inlet pipe, the metal fitting is a truncated cone member that is attached to an outer periphery of the steel pipe member with a small-diameter base of the truncated cone at a position 5 mm or more apart from an end of the inlet pipe.

8. An automotive member comprising:
a non-aluminized member made of a material comprising a ferritic stainless steel comprising, in mass %, at most 0.015% of C, at most 0.015% of N, 10.5% to 18.0% of Cr, 0.01% to 0.80% of Si, 0.01% to 0.80% of Mn, at most 0.050% of P, at most 0.010% of S, 0.010% to 0.100% of Al, more than 0.3% to 1.5% of Mo, one or both of at most 0.30% of Ti and at most 0.30% of Nb with a proviso that both of Ti and Nb are not less than 0.03%, and a balance in a form of Fe and inevitable impurities; and
a metal fitting made of an aluminized stainless steel sheet, wherein
the metal fitting is attached to the non-aluminized member to define a gap structure, which is to be exposed to a chloride environment, between the member and the metal fitting,
the metal fitting has an Al-plating weight per unit area ranging from 20 g/m² to 150 g/m² on a surface thereof facing a gap in the gap structure, and
a surface of the metal fitting and a surface of the non-aluminized member that do not face the gap are coated with a cation electrodeposition coating film having a thickness of 5 µm to 35 µm.

9. The automotive member according to claim 8, wherein a material for the metal fitting comprises a ferritic stainless steel of the same composition range as the material for the non-aluminized member except that the Mo content ranges from 0.005 mass % to 1.5 mass %.

10. The automotive member according to claim 8, wherein the material for the member further comprises at least one of a first group and a second group, the first group consisting of, in mass, at least one of 0.0002% to 0.0050% of B and 0.01% to 0.50% of Sn, the second group consisting of, in mass %, one or more of 0.01% to 0.5% of Cu, 0.01% to 0.5% of Ni, 0.005% to 0.5% of Sb, 0.005% to 0.5% of Zr, 0.005% to 0.5% of Co, 0.005% to 0.5% of W, 0.03% to 0.5% of V, 0.001% to 0.05% of Ga and 0.001% to 0.05% of Ta.

11. The automotive member according to claim 10, wherein a material for the metal fitting comprises a ferritic stainless steel of the same composition range as the material for the non-aluminized member except that the Mo content ranges from 0.005 mass % to 1.5 mass %.

12. An oil filler pipe comprising:
a non-aluminized steel pipe member made of a steel pipe of a material comprising a ferritic stainless steel comprising, in mass %, at most 0.015% of C, at most 0.015% of N, 10.5% to 18.0% of Cr, 0.01% to 0.80% of Si, 0.01% to 0.80% of Mn, at most 0.050% of P, at most 0.010% of S, 0.010% to 0.100% of Al, more than 0.3% to 1.5% of Mo, one or both of at most 0.30% of Ti and at most 0.30% of Nb with a proviso that both of Ti and Nb are not less than 0.03%, and a balance in a form of Fe and inevitable impurities; and
a metal fitting made of an aluminized stainless steel sheet, wherein
the metal fitting is attached to the steel pipe member to define a gap structure, which is to be exposed to a chloride environment, between a position on an outer circumferential surface of the non-aluminized steel pipe member not in contact with a fuel and the metal fitting,
the metal fitting has an Al-plating weight per unit area ranging from 20 g/m² to 150 g/m² on a surface thereof facing a gap in the gap structure, and
a surface of the metal fitting and a surface of the non-aluminized steel pipe member that do not face the gap are coated with a cation electrodeposition coating film having a thickness of 5 µm to 35 µm.

13. The oil filler pipe according to claim 12, wherein an oil inlet structure is defined, in which the steel pipe member is an inlet pipe, the metal fitting is a truncated cone member that is attached to an outer periphery of the steel pipe member with a small-diameter base of the truncated cone at a position 5 mm or more apart from an end of the inlet pipe.

14. The oil filler pipe according to claim 12, wherein the material for the steel pipe member further comprises at least one of a first group and a second group, the first group consisting of, in mass, at least one of 0.0002% to 0.0050% of B and 0.01% to 0.50% of Sn, the second group consisting of, in mass %, one or more of 0.01% to 0.5% of Cu, 0.01% to 0.5% of Ni, 0.005% to 0.5% of Sb, 0.005% to 0.5% of Zr, 0.005% to 0.5% of Co, 0.005% to 0.5% of W, 0.03% to 0.5% of V, 0.001% to 0.05% of Ga and 0.001% to 0.05% of Ta.

15. The oil filler pipe according to claim 14, wherein a material for the metal fitting comprises a ferritic stainless steel of the same composition range as the material for the steel pipe member except that the Mo content ranges from 0.005 mass % to 1.5 mass %.

16. The oil filler pipe according to claim 15, wherein an oil inlet structure is defined, in which the steel pipe member is an inlet pipe, the metal fitting is a truncated cone member that is attached to an outer periphery of the steel pipe member with a small-diameter base of the truncated cone at a position 5 mm or more apart from an end of the inlet pipe.

17. The oil filler pipe according to claim 14, wherein an oil inlet structure is defined, in which the steel pipe member is an inlet pipe, the metal fitting is a truncated cone member that is attached to an outer periphery of the steel pipe member with a small-diameter base of the truncated cone at a position 5 mm or more apart from an end of the inlet pipe.

18. The oil filler pipe according to claim 12, wherein a material for the metal fitting comprises a ferritic stainless steel of the same composition range as the material for the steel pipe member except that the Mo content ranges from 0.005 mass % to 1.5 mass %.

19. The oil filler pipe according to claim 18, wherein an oil inlet structure is defined, in which the steel pipe member is an inlet pipe, the metal fitting is a truncated cone member that is attached to an outer periphery of the steel pipe member with a small-diameter base of the truncated cone at a position 5 mm or more apart from an end of the inlet pipe.

* * * * *